(12) United States Patent
Emerson

(10) Patent No.: US 8,230,611 B1
(45) Date of Patent: Jul. 31, 2012

(54) STRAIGHT EDGE CLAMPING DEVICE HAVING CONNECTION LOCK

(76) Inventor: Eugene Emerson, Whittier, CA (US)

( * ) Notice: Subject to any disclaimer, the term of this patent is extended or adjusted under 35 U.S.C. 154(b) by 23 days.

(21) Appl. No.: 12/987,825

(22) Filed: Jan. 10, 2011

(51) Int. Cl.
    *B43L 7/00* (2006.01)
(52) U.S. Cl. .......................................... 33/430; 33/403
(58) Field of Classification Search .............. 33/403, 33/430, 443, 483, 485, 493
    See application file for complete search history.

(56) References Cited

U.S. PATENT DOCUMENTS

| | | | | |
|---|---|---|---|---|
| 2,968,325 | A * | 1/1961 | Wandvik | 83/435.14 |
| 4,281,572 | A * | 8/1981 | Stovall | 83/745 |
| 5,471,749 | A * | 12/1995 | Brady | 33/484 |
| 6,138,546 | A * | 10/2000 | Hursey | 83/875 |
| 6,622,997 | B2 * | 9/2003 | Emerson | 269/166 |
| 7,165,334 | B2 * | 1/2007 | Ben-Gigi | 33/485 |
| 7,484,306 | B2 * | 2/2009 | Emerson | 33/403 |
| 2010/0050452 | A1 * | 3/2010 | Wei | 33/483 |

* cited by examiner

*Primary Examiner* — G. Bradley Bennett
(74) *Attorney, Agent, or Firm* — John K. Park; Park Law Firm

(57) ABSTRACT

A straight edge clamping device includes front and rear sections and first and second connection locks. The connection lock is configured to be fit into the connecting ends of the elongated hollow portions of the front and rear sections. The first and second connection locks fit into the connecting ends of the first and second elongated hollow portions of the front and rear sections so as to connect and lock the front section with the rear section securely. Each of the first and second connection locks comprises: an outer surface fitting substantially tightly to at least a part of inner surface of the elongated hollow portion and an inner groove recessed inward from the outer surface, so as to provide rigidity against bending, shearing, or straining force on the straight edge clamping device.

15 Claims, 6 Drawing Sheets

STRAIGHT EDGE CLAMPING DEVICE HAVING CONNECTION LOCK

BACKGROUND OF THE INVENTION

The present invention relates to an extrusion cross-section for a straight edge clamping device. More particularly, the invention relates to an extrusion cross-section for a straight edge clamping device used to secure workpieces and to guide a power tool along the straight edge. Also, the invention relates to an extrusion cross-section for a straight edge clamping device which is strong and robust to external mechanical strain. Furthermore, the invention relates to a straight edge clamping device having connection locks.

Straight edge clamps are used in wood working for having a straight edge secured to a workpiece or workpieces so that a power tool or a guide for a power tool can be moved along the straight edge, for example, to form a cut edge with a circular hand saw or to form a trimmed edge with a hand router. Also, straight edge clamps are used for the purpose of holding accessory tool against a workpiece, for example, to form pocket holes.

A straight edge clamp by prior art includes a straight edge that is made of extruded aluminum and has an open channel, a fixed stop, a sliding stop that is received in the channel and can slide along the straight edge, and a bar or rod clamp. The sliding stop has a body that is inserted in the channel of the straight edge, and a jaw that protrudes from the body and out of the channel to secure a workpiece.

The shape of the straight edge, thickness of its cross-section, and manufacturing tolerance of extruded aluminum affects the stability of the straight edge when working on workpieces, such as making a cut with a hand circular saw, or hand router, or drilling pocket holes with an attached accessory tool.

When the workpiece are clamped between the fixed stop and the sliding stop with the clamping action of the bar clamp, the jaw of the sliding stop is forced against the workpiece, and the body of the sliding stop binds itself within the channel of the straight edge between the top and bottom surfaces of the channel.

The problem in a straight edge clamp by prior art is that aluminum extrusion products used for making straight edges has a minimum dimension variation of 20 mil, and this variation is the potential amount of movement of the straight edge even when the bar clamp of the straight edge clamp is securely engaged. The problem is inherent in the nature of aluminum extrusion.

The variation is affected by many factors such as shape, size and thickness of the straight edge. Such factors also affect the cost of the extrusion and ultimately the cost of the straight edge. Increasing the thickness of the straight edge for example will decrease the manufacturing dimension variation and increase accuracy and usability of the straight edge clamp. However, it increases the ultimate manufacturing cost of the straight edge clamp beyond practicality.

To solve the problems, optimizing of the mechanical structure is very important. The optimized cross-section of the extrusion can attach the variation problem and the manufacturing cost problem effectively.

Accordingly, there has been a demand for a more stable straight edge clamp with material and thus reduced manufacturing cost.

SUMMARY OF THE INVENTION

The present invention is contrived to overcome the conventional disadvantages. Therefore, an object of the invention is to provide an extrusion cross-section for a straight edge clamp having subsections for convenient handling.

To achieve the objects of the invention for the straight edge clamping device described in the above, a straight edge clamping device having connection locks is provided.

An aspect of the invention provides a straight edge clamping device comprising:

a front section comprising a connecting end and first and second elongated hollow portions disposed in a direction of length thereof;

a rear section comprising a connecting end and first and second elongated hollow portions disposed in a direction of length thereof;

a first connection lock configured to be fit into the connecting ends of the first elongated hollow portions of the front and rear sections; and a second connection lock configured to be fit into the connecting ends of the second elongated hollow portions of the front and rear sections, wherein the first and second connection locks fit into the connecting ends of the first and second elongated hollow portions of the front and rear sections so as to connect and lock the front section with the rear section securely, wherein each of the first and second connection locks comprises:

an outer surface fitting substantially tightly to at least a part of inner surface of the elongated hollow portion and extending in a direction of length thereof; and an inner groove recessed inward from the outer surface and extending in a direction of length thereof so as to provide rigidity against bending, shearing, or straining force on the straight edge clamping device.

The front and rear sections may be separable from each other by extracting the connection locks from the elongated hollow portions.

Each of the front and rear sections may comprise:

an elongated hollow base; and a clamping device for holding a workpiece on the base, wherein the base has a constant cross-section and comprises:

a flat top portion;

a flat bottom portion; and two L-cross-sectioned portions having a horizontal part and a vertical part, facing each other, wherein the vertical part of each L-cross-sectional portion is connected to a bottom surface of the flat top portion.

The first and second elongated hollow portions may be disposed between the horizontal parts and the flat bottom portion and facing each other, and integrated with the flat bottom portion.

The base may further comprise a plurality of frictional bands disposed along the flat bottom portion of the base in a direction of length of the base, wherein the plurality of frictional bands may increase a friction against the workpiece so as to keep the straight edge clamping device from skidding on the workpiece.

The base may further comprises a plurality of installing grooves for installing the plurality of frictional bands, wherein the plurality of installing grooves may be disposed on the flat bottom portion in a direction of length of the base.

Each of the plurality of frictional bands may have a cross-sectional shape substantially same as a corresponding installing groove.

The cross-sectional shapes may comprise circle, rectangle, pentagon, and hexagon.

The flat bottom portion may comprise a first bottom surface and a second bottom surface that are aligned on a plane.

Each of the first and second bottom surfaces may comprise at least one of the plurality of installing grooves.

Each of the first and second bottom surfaces may comprise two of the plurality of installing grooves.

The straight edge clamping device may further comprise:
two top side grooves, each of which being provided above one the horizontal part of the L-cross-sectioned portion and partially enclosed by the flat top portion, the vertical part of the L-cross-sectioned portion, and a diagonal extension from the hollow portion; and
a bottom groove disposed below the flat top portion and further partially enclosed by a part of the horizontal part of the L-cross-sectioned portion and the hollow portion.

The straight edge clamping device may further comprise:
a first stop fixed at an end of the base;
a second stop movably provided along the base; and
a clamp for holding the workpieces together.

The second stop may have a body movably received in a channel provided in the bottom groove and a stop for securing the workpieces, and the body of the second stop may have a shape reverse to the shape of the channel so that the body of the second stop and the channel interlock.

Each of the plurality of frictional bands may be attached to the flat bottom portion with glue.

The advantages of the present invention are: (1) the straight edge clamp can be maintained conveniently; and (2) the straight edge clamp sections can be connected stably to make a longer one.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

The U.S. Pat. Nos. 6,622,997 and 7,484,306 and U.S. patent application Ser. No. 12/862,585 filed Aug. 24, 2010 of the applicant are incorporated by reference into this disclosure as if fully set forth herein.

Figure 1:
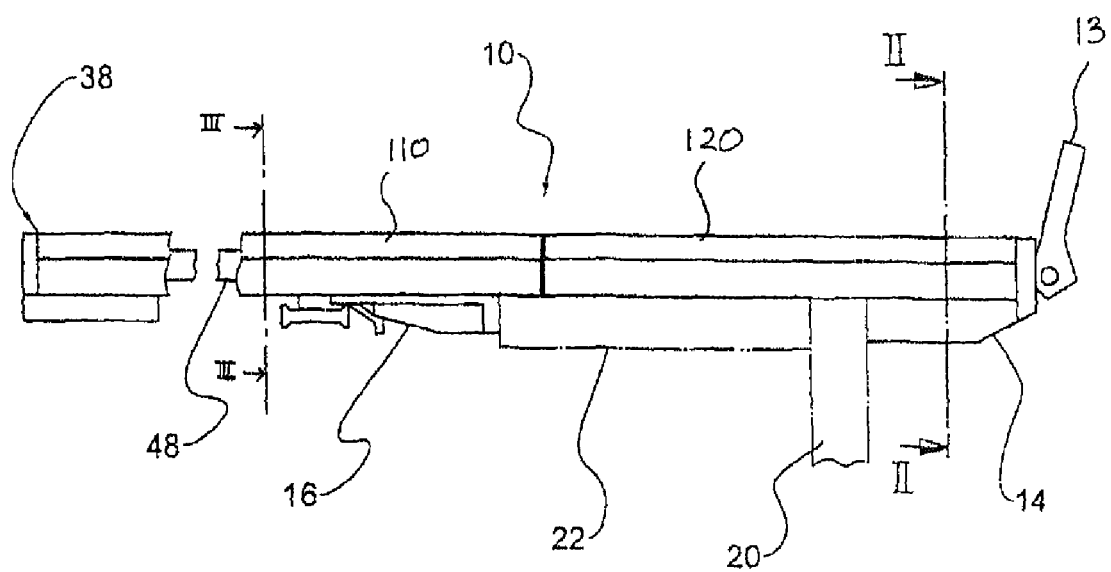
FIG. 1 is a front elevational view of a straight edge clamping device according to an embodiment of the present invention.
Figure 2:
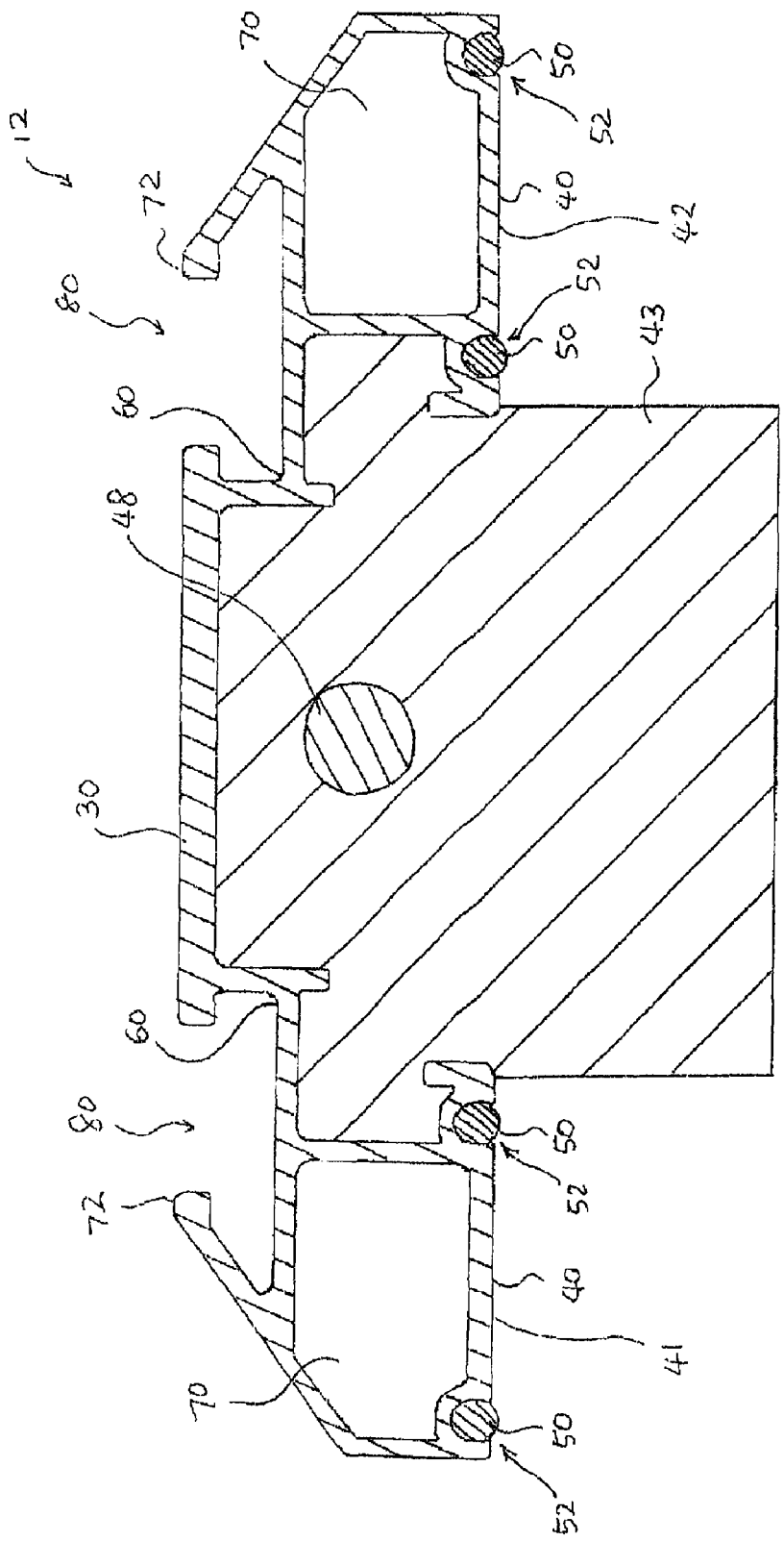
FIG. 2 is a cross-sectional view taken along II-II in FIG. 1.
Figure 3:
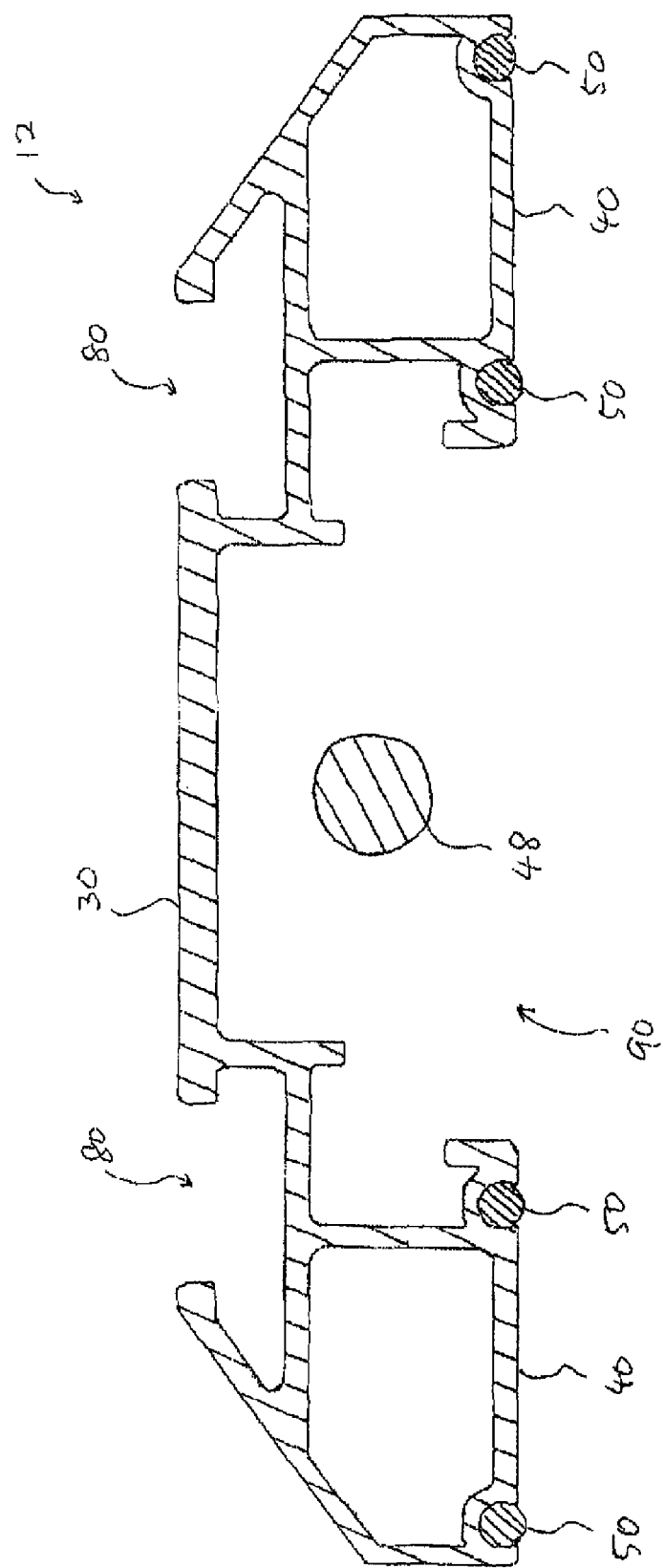
FIG. 3 is a cross-sectional view taken along III-III in FIG. 1.

FIG. 1 schematically shows a straight edge clamping device 10 for woodworking according to the invention. FIGS. 2 and 3 show cross-sections of the straight edge clamping device 10.

FIGS. 4-8 show parts of a straight edge clamping device 10 according to an embodiment of the invention.

Figure 4:
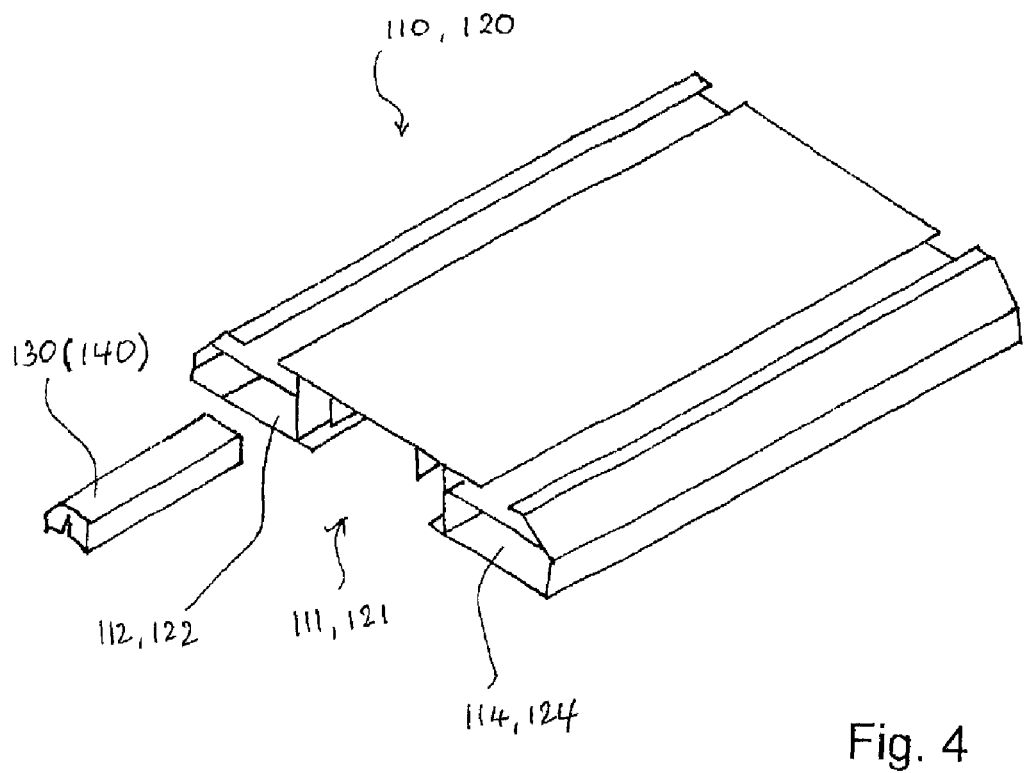
FIG. 4 is a perspective view showing a section of a straight edge clamping device with a connection lock removed from the section according to an embodiment of the invention.

To achieve the objects of the invention for the straight edge clamping device 10 described in the above, an aspect of the invention provides the straight edge clamping device 10 comprising:
a front section 110 comprising a connecting end 111 and first and second elongated hollow portions 112, 114 disposed in a direction of length thereof;
a rear section 120 comprising a connecting end 121 and first and second elongated hollow portions 122, 124 disposed in a direction of length thereof;
a first connection lock 130 configured to be fit into the connecting ends 111, 121 of the first elongated hollow portions 112, 122 of the front and rear sections 110, 120 (refer to FIG. 4); and
a second connection lock 140 configured to be fit into the connecting ends 111, 121 of the second elongated hollow portions 114, 124 of the front and rear sections 110, 120 (refer to FIG. 4 for a counter part).

The first and second connection locks 130, 140 fit into the connecting ends 111, 121 of the first and second elongated hollow portions 112, 114, 122, 124 of the front and rear sections 110, 120 so as to connect and lock the front section 110 with the rear section 120 securely.

Figure 5:
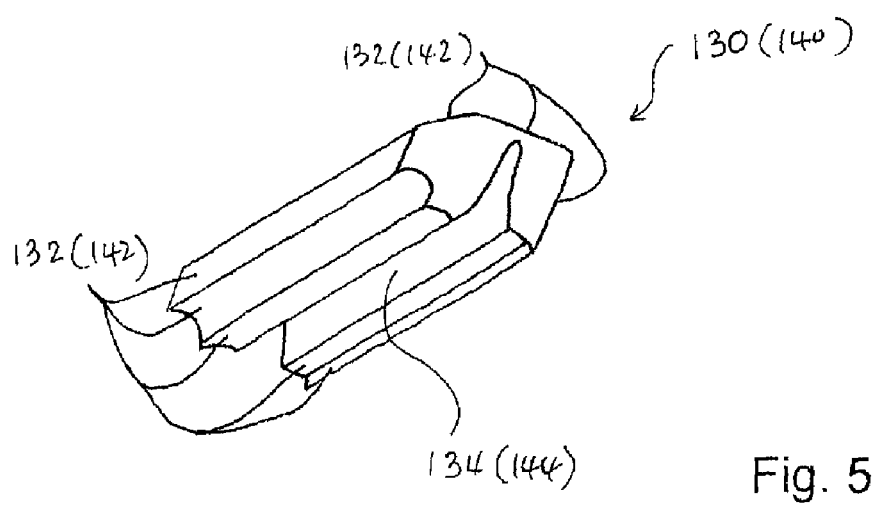
FIG. 5 is a perspective view showing the connection lock in FIG. 4.
Figure 6:
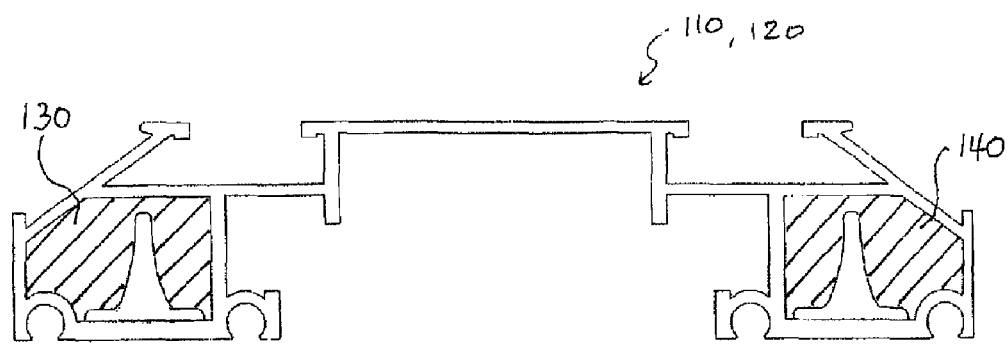
FIG. 6 is another cross-sectional of a straight edge clamping device with connection locks in place.

As shown in FIG. 4, the illustrated connection lock is the first connection lock 130. Actually, the second connection lock 140 has a mirror structure of the first connection lock 130. However, except for such a mirror image, they share the same features. Therefore, FIGS. 4 and 5 show the first connection lock 130 only for brevity. FIG. 6 shows two connection locks 130, 140 separately.

As shown in FIG. 5, each of the first and second connection locks 130, 140 comprises:
an outer surface 132, 142, fitting substantially tightly to at least a part of inner surface of the elongated hollow portion 112, 122 and extending in a direction of length thereof; and
an inner groove 134, 144 recessed inward from the outer surface 132, 142 and extending in a direction of length thereof so as to provide rigidity against bending, shearing, or straining force on the straight edge clamping device 10.

FIG. 6 shows a cross-sectional view of the first and second connection locks 130, 140 installed in the elongated hollow portion 112, 122, 114, 124.

Figure 7:
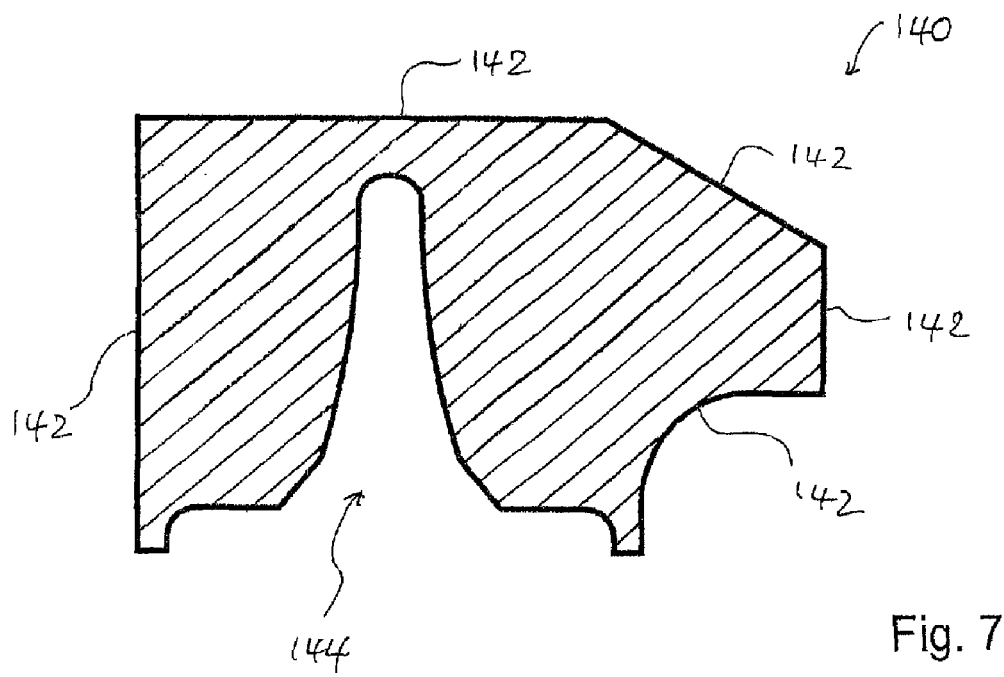
FIG. 7 is an enlarged cross-sectional view of the connection lock in FIG. 6.
Figure 8:
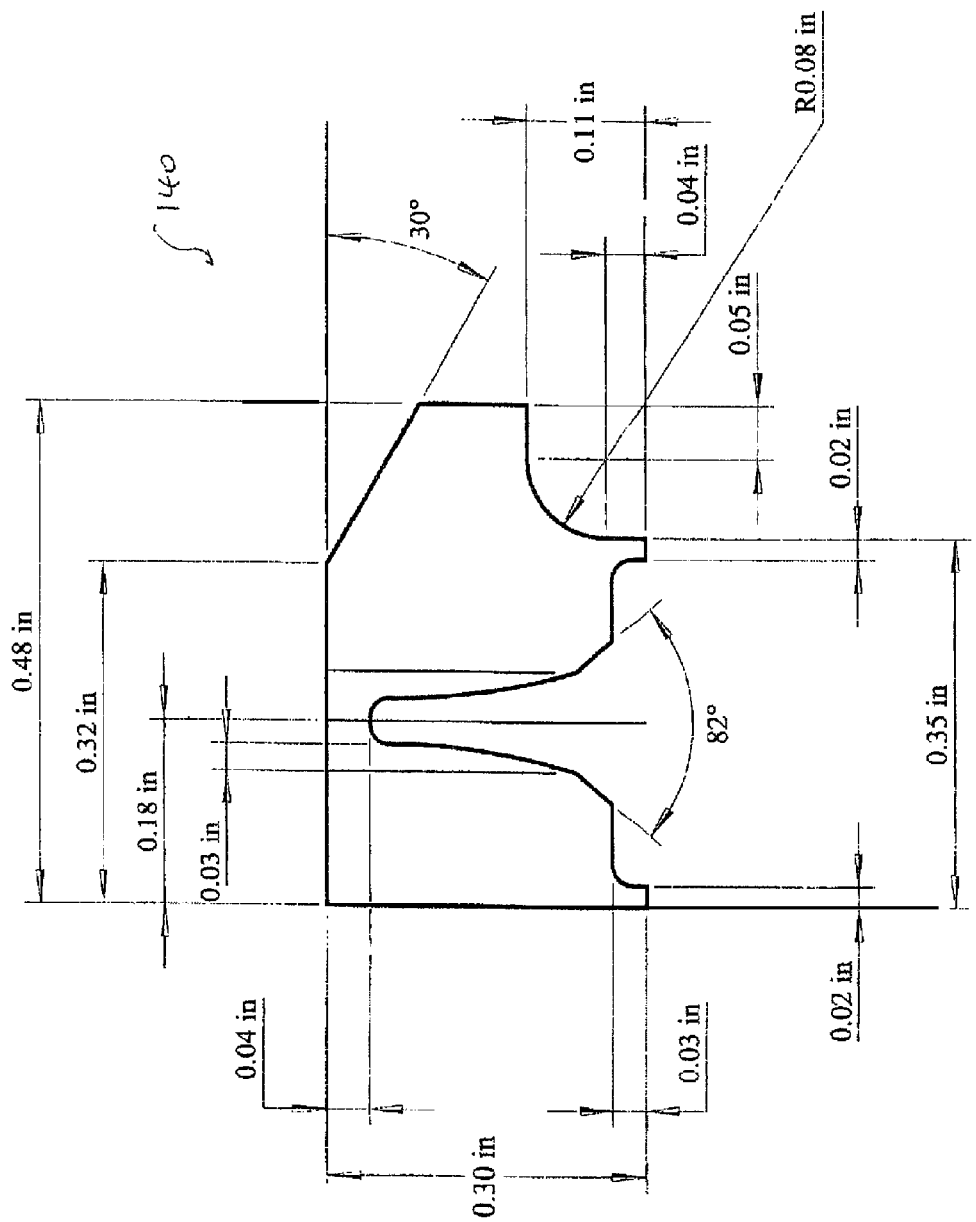
FIG. 8 is a cross-sectional view of a connection lock with detailed dimension according to an embodiment of the invention.

FIG. 7 shows a cross-sectional view of a second connection lock 140 in FIG. 6. The shape of outer surface 142 is configured to fit to the inner surface of the corresponding elongated hollow portion 112, 122, 114, 124.

The front and rear sections 110, 120 may be separable from each other by extracting the connection locks 130, 140 from the elongated hollow portions 112, 122, 114, 124. The resistance to pulling out for each other may depend on the frictional coefficient of the outer surface 132, 142 of the connection locks 130, 140 against the inner surface of the elongated hollow portions 112, 122, 114, 124, which may be adjusted by the margin of fitness and the material of the components.

Each of the front and rear sections 110, 120 may comprise: an elongated hollow base 12; and a clamping device 14, 16 for holding a workpiece 20, 22 on the base 12.

The base 12 has a constant cross-section and comprises: a flat top portion 30; a flat bottom portion 40; and two L-cross-sectioned portions 60 having a horizontal part and a vertical part, facing each other, wherein the vertical part of each L-cross-sectional portion 60 may be connected to a bottom surface of the flat top portion 30.

The first and second elongated hollow portions 112, 122, 114, 124 (in FIGS. 4-8), that is, the two hollow portions 70 (in FIGS. 1-3) may be disposed between the horizontal parts and the flat bottom portion, facing each other, and integrated with the flat bottom portion 40.

The straight edge clamping device 10 has an elongated hollow base 12 and a clamping device 14, 16 for holding a workpiece 20, 22 on the base 12 is provided.

The base 12 having a constant cross-section and comprises: a flat top portion 30; a flat bottom portion 40; and a plurality of frictional bands 50 disposed along the flat bottom portion 40 of the base 12 in a direction of length of the base 12.

The plurality of frictional bands 50 increase a friction against the workpiece 20, 22 so as to keep the straight edge clamping device 10 from skidding on the workpiece 20,22.

The straight edge clamping device 10 may further comprise a plurality of installing grooves 52 for installing the plurality of frictional bands 50, and the plurality of installing grooves 52 may be disposed on the flat bottom portion 40 in a direction of length of the base 12.

Each of the plurality of frictional bands 50 may have a cross-sectional shape substantially same as a corresponding installing groove 52.

The cross-sectional shapes may comprise circle, rectangle, pentagon, hexagon.

The cross-section of the frictional bands 50 and the installing groove 52 may be circle as illustrated in FIGS. 2 and 3.

The flat bottom portion 40 may comprise a first bottom surface 41 and a second bottom surface 42 that are aligned on a plane as shown in FIGS. 2 and 3.

Each of the first and second bottom surfaces 41, 42 may comprise at least one of the plurality of installing grooves 52.

Each of the first and second bottom surfaces 41, 42 may comprise two of the plurality of installing grooves 52 as illustrated in FIGS. 2 and 3.

The straight edge clamping device 10 may further comprise two L-cross-sectioned portions 60 and two hollow portions 70.

The straight edge clamping device 10 may further comprise two top side grooves 80 and a bottom groove 90.

Each of the two top side grooves 80 may be provided above one the horizontal part of the L-cross-sectioned portion 60 and partially enclosed by the flat top portion 30, the vertical part of the L-cross-sectioned portion 60, and a diagonal extension 72 from the hollow portion 70.

The bottom groove 90 is disposed below the flat top portion 30 and further partially enclosed by a part of the horizontal part of the L-cross-sectioned portion 60 and the hollow portion 70.

The straight edge clamping device 10 may further comprise: a first stop 14 fixed at an end of the base 12; a second stop 16 movably provided along the base 12; and a clamp 13 for holding the workpieces 20, 22 together.

The second stop 16 may have a body movably received in a channel provided in the bottom groove 90 and a stop for securing the workpieces 20, 22, and the body of the second stop 16 may have a shape reverse to the shape of the channel so that the body of the second stop 16 and the channel interlock.

Each of the plurality of frictional bands 50 may be attached to the flat bottom portion 40 with glue.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A straight edge clamping device comprising:
   a front section comprising a connecting end and first and second elongated hollow portions disposed in a direction of length thereof;
   a rear section comprising a connecting end and first and second elongated hollow portions disposed in a direction of length thereof;
   a first connection lock configured to be fit into the connecting ends of the first elongated hollow portions of the front and rear sections; and
   a second connection lock configured to be fit into the connecting ends of the second elongated hollow portions of the front and rear sections,
   wherein the first and second connection locks fit into the connecting ends of the first and second elongated hollow portions of the front and rear sections so as to connect and lock the front section with the rear section securely,
   wherein each of the first and second connection locks comprises:
      an outer surface fitting substantially tightly to at least a part of inner surface of the elongated hollow portion and extending in a direction of length thereof; and
      an inner groove recessed inward from the outer surface and extending in a direction of length thereof so as to provide rigidity against bending, shearing, or straining force on the straight edge clamping device.

2. The straight edge clamping device of claim 1, wherein the front and rear sections are separable from each other by extracting the connection locks from the elongated hollow portions.

3. The straight edge clamping device of claim 1, wherein each of the front and rear sections comprises:
   an elongated hollow base; and
   a clamping device for holding a workpiece on the base,
   wherein the base has a constant cross-section and comprises:
   a flat top portion;
   a flat bottom portion; and
   two L-cross-sectioned portions having a horizontal part and a vertical part, facing each other, wherein the vertical part of each L-cross-sectional portion is connected to a bottom surface of the flat top portion.

4. The straight edge clamping device of claim 3, wherein the first and second elongated hollow portions are disposed between the horizontal parts and the flat bottom portion and facing each other, and integrated with the flat bottom portion.

5. The straight edge clamping device of claim 1, wherein the base further comprises a plurality of frictional bands disposed along the flat bottom portion of the base in a direction of length of the base, wherein the plurality of frictional bands increase a friction against the workpiece so as to keep the straight edge clamping device from skidding on the workpiece.

6. The straight edge clamping device of claim 5, wherein the base further comprises a plurality of installing grooves for installing the plurality of frictional bands, wherein the plurality of installing grooves are disposed on the flat bottom portion in a direction of length of the base.

7. The straight edge clamping device of claim 6, wherein each of the plurality of frictional bands has a cross-sectional shape substantially same as a corresponding installing groove.

8. The straight edge clamping device of claim 7, wherein the cross-sectional shapes comprise circle, rectangle, pentagon, hexagon.

9. The straight edge clamping device of claim 6, wherein the flat bottom portion comprises a first bottom surface and a second bottom surface that are aligned on a plane.

10. The straight edge clamping device of claim 9, wherein each of the first and second bottom surfaces comprises at least one of the plurality of installing grooves.

11. The straight edge clamping device of claim 10, wherein each of the first and second bottom surfaces comprises two of the plurality of installing grooves.

12. The straight edge clamping device of claim 11, further comprising:

two top side grooves, each of which being provided above one the horizontal part of the L-cross-sectioned portion and partially enclosed by the flat top portion, the vertical part of the L-cross-sectioned portion, and a diagonal extension from the hollow portion; an a bottom groove disposed below the flat top portion and further partially enclosed by a part of the horizontal part of the L-cross-sectioned portion and the hollow portion.

13. The straight edge clamping device of claim 12, further comprising:

a first stop fixed at an end of the base;

a second stop movably provided along the base; and a clamp for holding the workpieces together.

14. The straight edge clamping device of claim 13, wherein the second stop has a body movably received in a channel provided in the bottom groove and a stop for securing the workpieces, wherein the body of the second stop has a shape reverse to the shape of the channel so that the body of the second stop and the channel interlock.

15. The straight edge clamping device of claim 6, wherein each of the plurality of frictional bands is attached to the flat bottom portion with glue.

* * * * *